Figure 1:
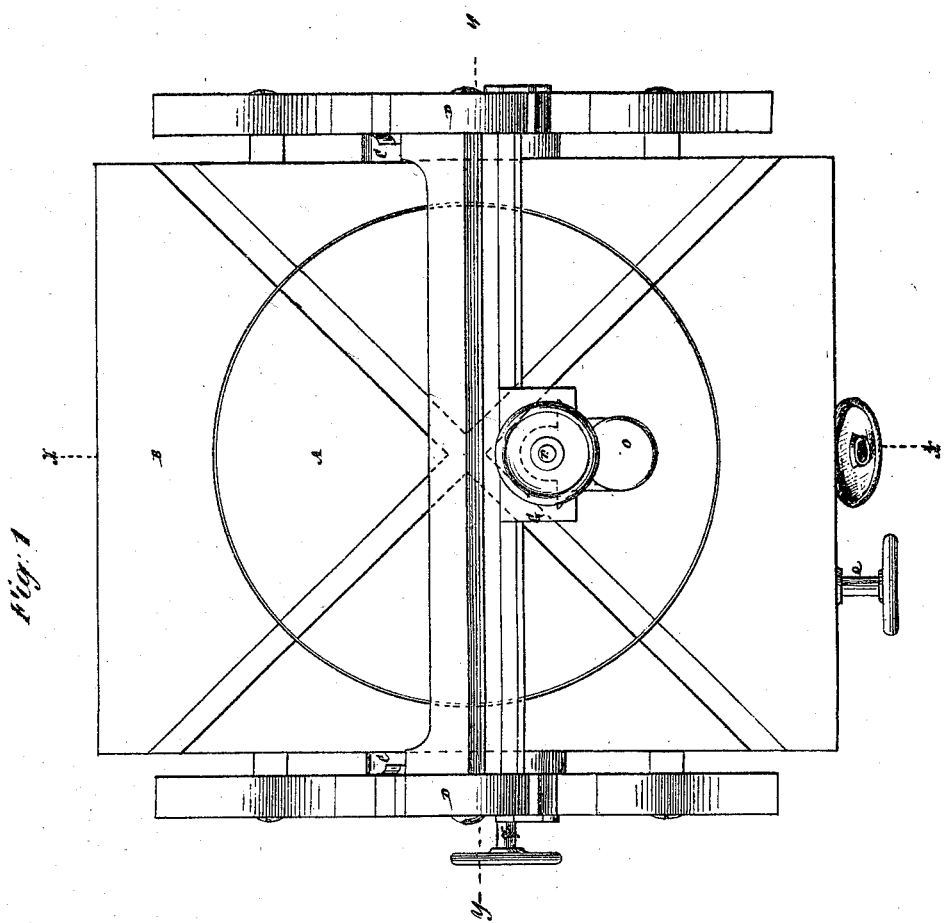

2 Sheets--Sheet 1.

H. COTTRELL.

Improvement in Machines for Routing Metals.

No. 128,596. Patented July 2, 1872.

Witnesses:
Fred Haymer
R. J. Rabeau

Herbert Cottrell
per Brown Combs & Co
Attorneys

H. COTTRELL.
Improvement in Machines for Routing Metals.
No. 128,596. Patented July 2, 1872.
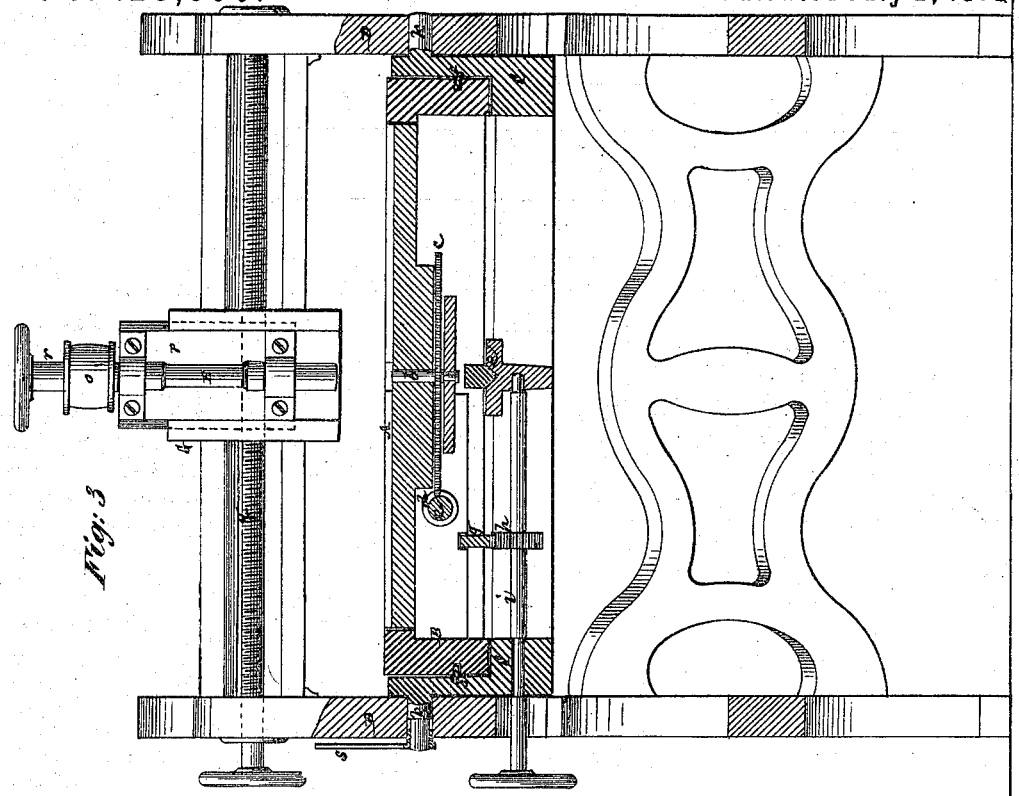
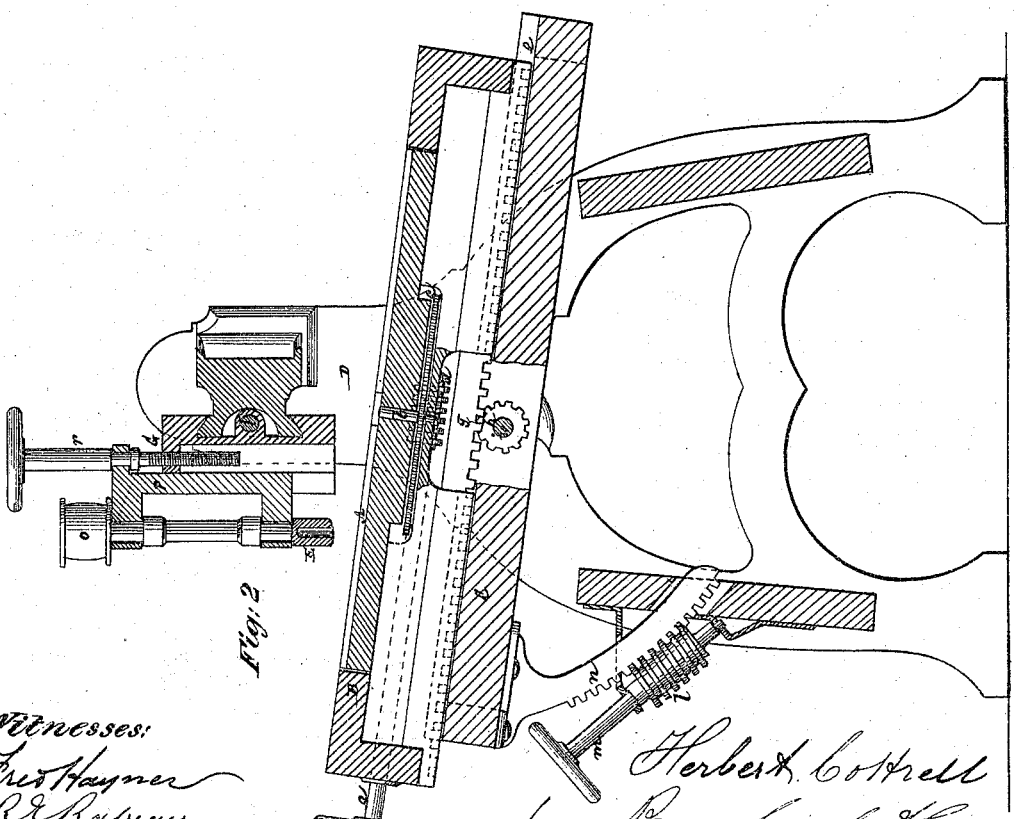
Witnesses:
Fred Hayner
R. J. Rabeau
Herbert Cottrell
per Brown, Coombs & Co
Attorneys 128,596

UNITED STATES PATENT OFFICE.

HERBERT COTTRELL, OF NEWARK, NEW JERSEY.

IMPROVEMENT IN MACHINES FOR ROUTING METALS.

Specification forming part of Letters Patent No. 128,596, dated July 2, 1872.

Specification describing an Improvement in Machines for Routing Metals and other Materials, the invention of HERBERT COTTRELL, of Newark, in the county of Essex and State of New Jersey.

This invention consists in a machine for routing metals and other materials, in which a rotary cutter capable of reciprocating action across the surface to be routed is combined with a bed or face plate constructed to hold the work, and made capable of rotation on its axis, as also of reciprocating travel in a crosswise direction to the reciprocating movement of the cutter; likewise of a variation in its position from a horizontal to an angular one, or rather to different angles. By these combined movements, which are separately controlable, every provision is made for routing various surfaces and in various directions to meet all the requirements of a routing-machine.

In the accompanying drawing, which forms part of this specification, Figure 1 represents a plan of a routing-machine constructed in accordance with my improvement. Fig. 2 is vertical section of the same at the line $x\,x$, and Fig. 3 is a vertical section at the line $y\,y$ in Fig. 1.

Similar letters of reference indicate corresponding parts throughout the several figures of the drawing.

A is the bed or face plate on which the work to be routed is secured, and which, as well as an upper table, B, that carries it, is suitably grooved for the purpose. The bed-plate A is of circular form and occupies a sunken position within the table B, so that its surface is flush or nearly so with that of the latter. Said bed or face plate is adjustable and made capable of motion around its axis $b$ by means of a worm-wheel, $c$, and screw $d$, fast to a shaft, $e$, which has its bearings in the table B, that is adjustable or movable back and forth in a lengthwise direction along a way, $e$, and side guides $ff$ fast to an under table, C, such adjustment or movement being effected by means of a rack, $g$, on the under side of the table B and pinion $h$ upon a shaft, $i$, which has its bearings in the under table C. The under table C is hung, by trunnions $k\,k$, in the side pieces D D of the main frame, and is capable of being rocked therein to adjust the bed-plate A and upper table B either into a horizontal or inclined position, for the purpose of varying the angle of the same relatively to the cutter, and which may be determined by an index, $s$, on the end of one of the trunnions. This adjustment is effected by an endless screw, $l$, upon a shaft, $m$, having its bearings in the main frame, and curved rack $n$ fast to the one end of the under table C. E is the rotary cutter-shaft arranged to occupy a vertical position over the bed-plate A, and receiving its motion by a pulley, $o$. This shaft, to the lower end of which the rotary cutter is attached, is carried by a vertical slide, $p$, of a head-stock, G, which is capable of movement in a transverse direction across the machine by a screw, $q$, that is in a crosswise direction to the adjustment or travel of the upper table B, while the slide $p$ is adjustable up or down by a screw, $r$, to project the cutter into or release it from the work.

What is here claimed, and desired to be secured by Letters Patent, is—

1. The combination, with the rotary cutter-shaft E and transversely adjustable head-stock G, of the longitudinally adjustable upper table B, circularly adjustable bed-plate A, and swinging or rocking under table C, substantially as and for the purpose or purposes herein set forth.

2. The combination of the circularly-adjustable bed-plate A with the rocking under table C, longitudinally adjustable upper table B, and rotary cutter E, substantially as described.

3. The combination, with the subject-matter of the first and second clauses of claim, of the screw $d$, the worm-wheel $c$, the rack $g$, the pinion $h$, the screw $l$, the curved rack $n$, the screws $q\,r$, and the slide $p$, essentially as described.

HERBERT COTTRELL.

Witnesses:
I. M. TAYLOR,
H. C. CONDIT.